(12) United States Patent
Kondo et al.

(10) Patent No.: US 8,203,297 B2
(45) Date of Patent: Jun. 19, 2012

(54) MOTOR CONTROL APPARATUS FOR CONTROLLING MOTOR IN ACCORDANCE WITH ROTATIONAL POSITION OF ROTOR THEREOF

(75) Inventors: Taizo Kondo, Kariya (JP); Hideki Kabune, Nagoya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 382 days.

(21) Appl. No.: 12/493,416

(22) Filed: Jun. 29, 2009

(65) Prior Publication Data
US 2009/0322269 A1 Dec. 31, 2009

(30) Foreign Application Priority Data
Jun. 30, 2008 (JP) ................................ 2008-170795

(51) Int. Cl.
*H02P 6/18* (2006.01)
*H02P 6/00* (2006.01)
*H02P 27/00* (2006.01)
*G05B 11/28* (2006.01)

(52) U.S. Cl. .............. 318/400.34; 318/400.01; 318/599; 318/799; 318/811

(58) Field of Classification Search ............ 318/400.01, 318/400.34, 599, 799, 811
See application file for complete search history.

(56) References Cited

U.S. PATENT DOCUMENTS

| | | | | |
|---|---|---|---|---|
| 4,629,958 A | * | 12/1986 | Kurakake et al. | 318/723 |
| 4,678,971 A | * | 7/1987 | Kanazawa et al. | 318/135 |
| 4,718,514 A | * | 1/1988 | Hirakushi | 180/422 |
| 5,896,019 A | * | 4/1999 | Nashiki et al. | 318/701 |
| 6,400,116 B1 | * | 6/2002 | Chen et al. | 318/599 |
| 6,538,404 B2 | * | 3/2003 | Kato et al. | 318/400.06 |
| 6,704,627 B2 | * | 3/2004 | Tatara et al. | 701/22 |
| 6,798,161 B2 | * | 9/2004 | Suzuki | 318/434 |
| 6,906,491 B2 | * | 6/2005 | Matsuo et al. | 318/722 |
| 7,304,452 B2 | * | 12/2007 | Nagai et al. | 318/811 |
| 7,342,366 B2 | * | 3/2008 | Ueda et al. | 318/254.1 |
| 7,977,899 B2 | * | 7/2011 | Hasegawa et al. | 318/400.01 |
| 2004/0027083 A1 | * | 2/2004 | Suzuki | 318/434 |
| 2006/0132083 A1 | * | 6/2006 | Ueda et al. | 318/798 |
| 2008/0042614 A1 | * | 2/2008 | Oomura et al. | 318/799 |

FOREIGN PATENT DOCUMENTS
JP 2005-253226 9/2005
JP 2005-335591 12/2005

* cited by examiner

*Primary Examiner* — Walter Benson
*Assistant Examiner* — Gabriel Agared
(74) *Attorney, Agent, or Firm* — Nixon & Vanderhye PC

(57) ABSTRACT

The motor control apparatus includes a power supply function of supplying electric power from a power supply to a motor, a rotational position detecting function of performing detection of a rotational position of a rotor of the motor for respective phases of the motor, and outputting first rotational position data indicative of result of the detection, a control function of controlling a power supply operation of the power supply function in accordance with the first rotational position data, and an induced voltage detecting function of performing detection of induced voltages of the respective phases of the motor. The control function controls the power supply operation of the power supply function in accordance with result of the detection performed by the induced voltage detecting function when the first rotational position data are abnormal.

4 Claims, 7 Drawing Sheets

MOTOR CONTROL APPARATUS FOR CONTROLLING MOTOR IN ACCORDANCE WITH ROTATIONAL POSITION OF ROTOR THEREOF

CROSS-REFERENCE TO RELATED APPLICATION

This application is related to Japanese Patent Application No. 2008-170795 filed on Jun. 30, 2008, the contents of which are hereby incorporated by reference.

BACKGROUND OF THE INVENTION

1. Field of the Invention

The present invention relates to a motor control apparatus for controlling a motor in accordance with rotational position data of the rotor of the motor.

2. Description of Related Art

Japanese Patent Application Laid-open No. 2005-253226, for example, discloses such a motor control apparatus for a vehicle use a brushless motor. This control apparatus outputs drive signals in accordance with detection results by a rotational position detecting function of the brushless motor when the rotational position detecting function operates normally. On the other hand, when the rotational position detecting function does not operate normally, the control apparatus outputs drive signals of a predetermined switch-over pattern, so that the brushless motor can be driven even after a fault occurs in the rotational position detecting function of the brushless motor.

The drive signals applied to the brushless motor have to be switched over at appropriate timings in accordance with detection results of the rotational position of the brushless motor. However, in the above conventional control apparatus, since the brushless motor is applied with the drive signals of the predetermined switch-over pattern when the rotational position detecting function is in a fault state, there may occur a case in which drive signals applied to the brushless motor change over at inappropriate timings, causing the brushless motor to be driven out of order.

SUMMARY OF THE INVENTION

The present invention provides a motor control apparatus comprising:

a power supply function of supplying electric power from a power supply to a motor;

a rotational position detecting function of performing detection of a rotational position of a rotor of the motor for respective phases of the motor, and outputting first rotational position data indicative of result of the detection;

a control function of controlling a power supply operation of the power supply function in accordance with the first rotational position data; and an induced voltage detecting function of performing detection of induced voltages of the respective phases of the motor;

wherein the control function controls the power supply operation of the power supply function in accordance with result of the detection performed by the induced voltage detecting function when the first rotational position data is abnormal.

The control function may acquire second rotational position data indicative of a rotational position of the rotor of the motor for the respective phases of the motor on the basis of result of the detection performed by the induced voltage detecting function when any of the first rotational position data is abnormal, and control the power supply operation of the power supply function in accordance with the second rotational position data.

When any of the first rotational position data is normal and any of the first rotational position data is abnormal, the control function may acquire one of the second rotational position data corresponding to the abnormal one of the first rotational position data on the basis of result of the detection performed by the induced voltage detecting function, and control the power supply operation of the power supply function in accordance with the first rotational position data excluding the abnormal one of the first rotational position data and one of the second rotational position data corresponding to the abnormal one of the first rotational position data.

The control function may acquire the second rotational position data on the basis of timings at which polarities of the induced voltages change.

The control function may determine whether the first rotational position data are normal or not on the basis of result of the detection performed by the induced voltage detecting function.

According to the present invention, there is provided a motor control apparatus of the type to control a motor on the basis of rotational position data indicative of a rotational position of the rotor of the motor outputted from a rotational position detection device mounted on the motor, which is capable of continuing to control the motor in order even when there is an abnormality in rotational position data.

Other advantages and features of the invention will become apparent from the following description including the drawings and claims.

PREFERRED EMBODIMENTS OF THE INVENTION

Figure 1:
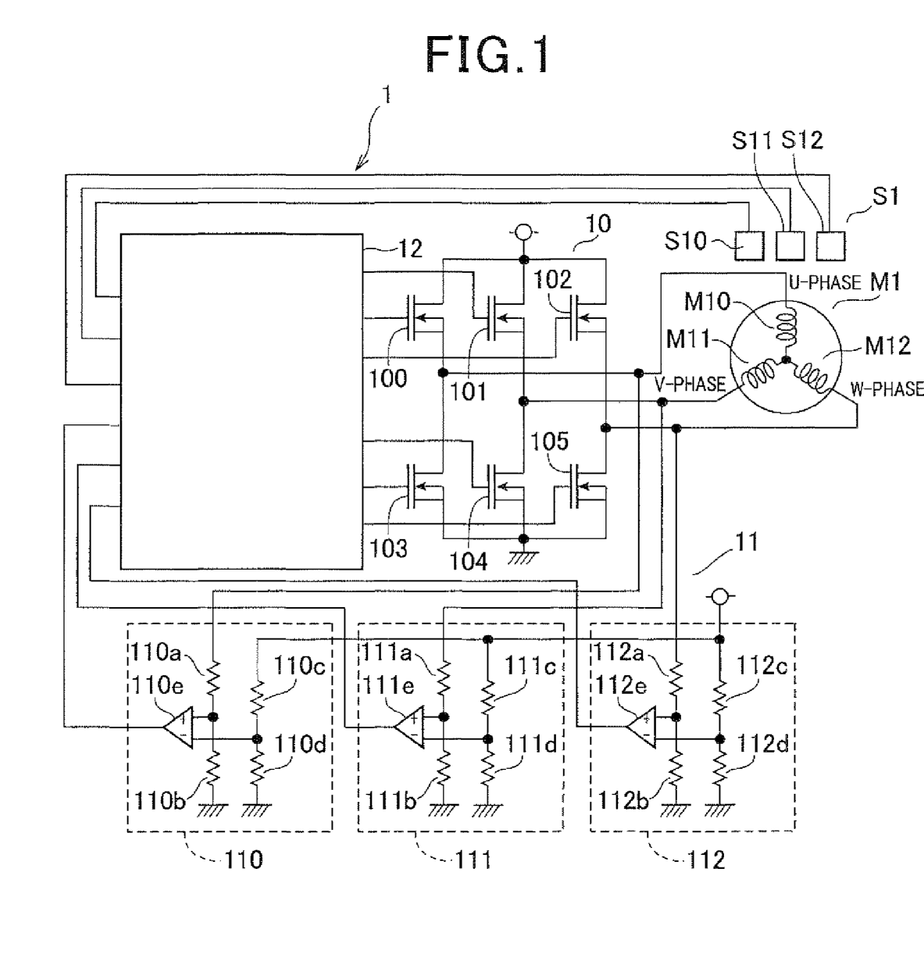
FIG. 1 is a circuit diagram of a motor control apparatus according to an embodiment of the invention.

FIG. 1 is a circuit diagram of a motor control apparatus 1 according to an embodiment of the invention.

The motor control apparatus 1 is an apparatus for controlling a motor M1. The motor M1 is constituted of a stator including a U-phase coil M10, a V-phase coil M11 and a W-phase coil 12 which are Y-connected to one another, a rotor (not shown) having a magnet fixed thereto, and a rotational position detection device S1 for detecting a rotational position of the rotor. The rotational position detection device S1 outputs rotational position data indicative of a detected rotational position of the rotor as rectangular wave signals for the respective phases of the motor M1. The rotational position detection device S1 includes three rotational position detecting elements S10 to S12 provided for the respective phases of the motor M1. Each of the rotational position detecting elements S10 to S12 is a Hall IC which detects magnetic flux of the magnet fixed to the rotor, and outputs the rotational position data as a rectangular wave signal.

The motor control apparatus 1 is constituted of a power supply circuit 10, an induced voltage detection circuit 11, and a microcomputer 12.

The power supply circuit 10 is a circuit controlled by the microcomputer 12 to supply electric power from a power supply (not shown) to the motor M1. The power supply circuit 10 is constituted of MOSFETs 100 to 105. The MOSFETs 100 and 103, the MOSFETs 101 and 104, and the MOSFETs 102 and 105 are respectively connected in series. The series connections of the MOSFETs 100 and 103, the MOSFETs 101 and 104, and the MOSFETs 102 and 105 are connected in parallel to one another. The drains of the MOSFETs 100 to 102 are connected to the positive terminal of the power supply, and the sources of the MOSFETs 103 to 105 are connected to the negative terminal of the power supply. The gates of the MOSFETs 100 to 105 are connected to the microcomputer 12. The connection nodes of the MOSFETs 100 and 103, of the MOSPETs 101 and 104, and of the MOSFETs 102 and 105 serve as the U-phase output terminal, the V-phase output terminal and the W-phase output terminal, respectively. The U-phase output terminal, V-phase output terminal and W-phase output terminal are connected respectively to the U-phase terminal, V-phase terminal and W-phase terminal of the motor M1.

The induced voltage detection circuit 11 is a circuit which detects the induced voltages of the respective phases of the motor M1, and outputs a rectangular wave signal showing timings at which the polarity of the induced voltage changes for each of the phases. The induced voltage detection circuit 11 is constituted by a U-phase induced voltage detection circuit 110, a V-phase induced voltage detection circuit 111 and a W-phase induced voltage detection circuit 112.

The U-phase induced voltage detection circuit 110 is a circuit which detects the induced voltage of the U-phase of the motor M1, and outputs a rectangular wave signal showing timings at which the polarity of the U-phase voltage (U-phase induced voltage) changes. The U-phase induced voltage detection circuit 110 is constituted by resistors 110a to 110d and a comparator 110e.

The resistors 110a and 110b are elements for dividing the U-phase voltage of the motor M1 by one half. The resistors 110a and 110b are series-connected to each other. One end of the series connection of the resistors 110a and 110b is connected to the U-phase of the motor M1, and the other end is connected to the negative terminal of the power supply.

The resistors 110c and 110d are elements for generating a reference voltage by dividing the voltage of the power supply by one fourth. The resistors 110c and 110c are series-connected to each other. One end of the series connection of the resistors 110c and 110d is connected to the positive terminal of the power supply, and the other end is connected to the negative terminal of the power supply.

The comparator 110e is an element for comparing the U-phase voltage divided by the resistors 110a and 110b with the reference voltage generated by the resistors 110c and 110d. The non-inverting input terminal of the comparator 110e is connected to the connection node of resistors 110a and 110b, and the inverting input terminal of the comparator 110e is connected to the connection node of resistors 110c and 110d. The output terminal of the comparator 110e is connected to the microcomputer 12.

The V-phase induced voltage detection circuit 111 is a circuit which detects the induced voltage of the V-phase of the motor M1, and outputs a rectangular wave signal showing timings at which the polarity of the V-phase voltage (V-phase induced voltage) changes. The V-phase induced voltage detection circuit 111 has the same structure as the U-phase induced voltage detection circuit 110. One end of the series connection of the resistors 111a and 111b is connected to the V-phase of the motor M1, and the other end is connected to the negative terminal of the power supply. One end of the series connection of the resistors 111c and 111d is connected to the positive terminal of the power supply, and the other end is connected to the negative terminal of the power supply. The non-inverting input terminal of the comparator 111e is connected to the connection node of resistors 111a and 111b, and the inverting input terminal of the comparator 111e is connected to the connection node of resistors 111c and 111d. The output terminal of the comparator 111e is connected to the microcomputer 12.

The W-phase induced voltage detection circuit 111 is a circuit which detects the induced voltage of the W-phase of the motor M1, and outputs a rectangular wave signal showing timings at which the polarity of the W-phase voltage (W-phase induced voltage) changes. The W-phase induced voltage detection circuit 112 has the same structure as the U-phase induced voltage detection circuit 110. One end of the series connection of the resistors 112a and 112b is connected to the W-phase of the motor M1, and the other end is connected to the negative terminal of the power supply. One end of the series connection of the resistors 112c and 112d is connected to the positive terminal of the power supply, and the other end is connected to the negative terminal of the power supply. The non-inverting input terminal of the comparator 112e is connected to the connection node of resistors 112a and 112b, and the inverting input terminal of the comparator 112e is connected to the connection node of resistors 112c and 112d. The output terminal of the comparator 112e is connected to the microcomputer 12.

The microcomputer 12 operates to turn on and off the MOSFETs 100 to 105 in accordance with the detection results by the rotational position detection device S1. However, if the detection results by the rotational position detection device S1 are abnormal, the microcomputer 12 turns on and off the MOSFETs 100 to 105 in accordance with the detection results by the induced voltage detection circuit 11. To be more exact, when at least one of the detection results by the rotational position detection device S1 is normal, even if the others are abnormal, the microcomputer 12 acquires rotational position data corresponding to abnormal one of the detection results on the basis of the detection results by the induced voltage detection circuit 11, and turns on and off the MOSFETs 100 to 105 in accordance with the normal detection results and the acquired rotational position data. On the other hand, when the detection results by the rotational position detection device S1 are all abnormal, the microcomputer 12 acquires rotational position data corresponding to each of the abnormal detection results on the basis of the detection results by the induced voltage detection circuit 11, and turns on and off the MOSFETs 100 to 105 in accordance with the acquired rotational position data. The microcomputer 12 has six output terminals connected respectively to the gates of the MOSFETs 100 to 105. The microcomputer 12 has six input terminals three of which are connected respectively to the rotational position detecting elements S10 to S12. The other three of the input terminals of the microcomputer 12 are connected respectively to the output terminals of the comparators 110e, 111e and 112e.

Figure 2:
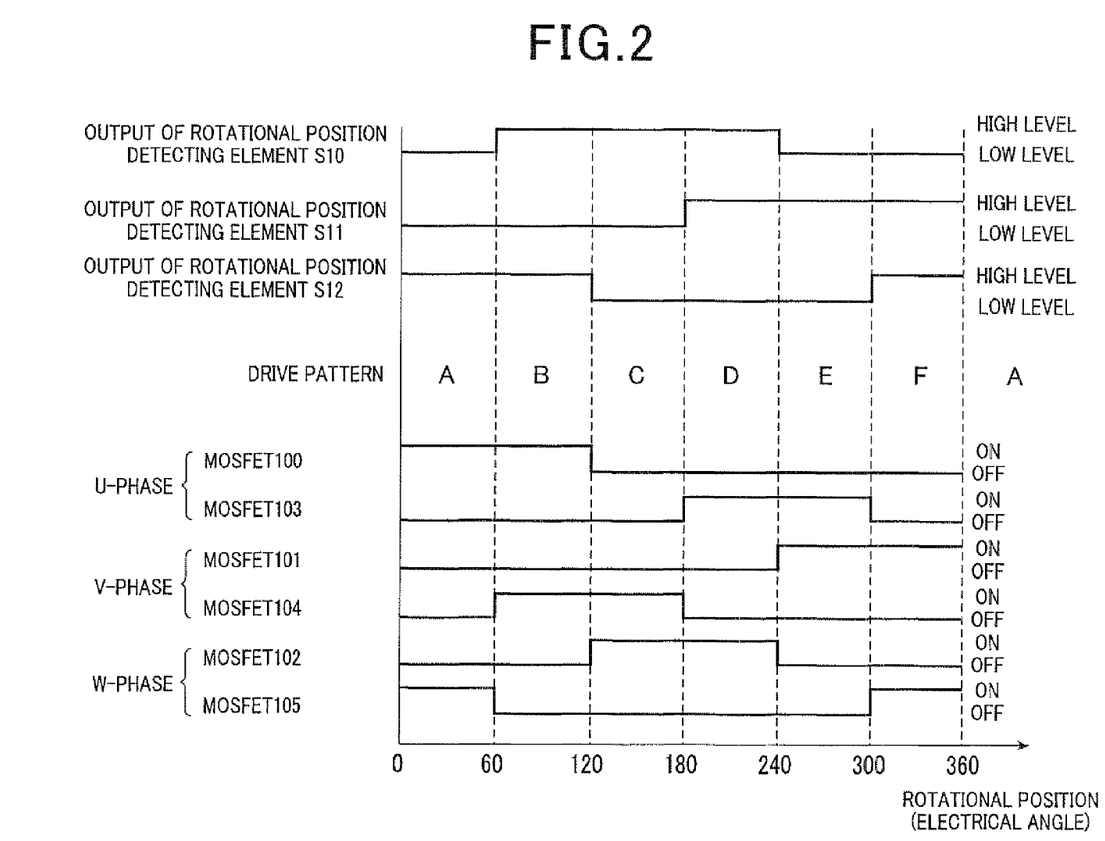
FIG. 2 is an explanatory view for explaining various driven states of a power supply circuit included in the motor control apparatus with respect to the output of an rotational position detection device for detecting a rotational position of the rotor of a motor controlled by the motor control apparatus.
Figure 3:
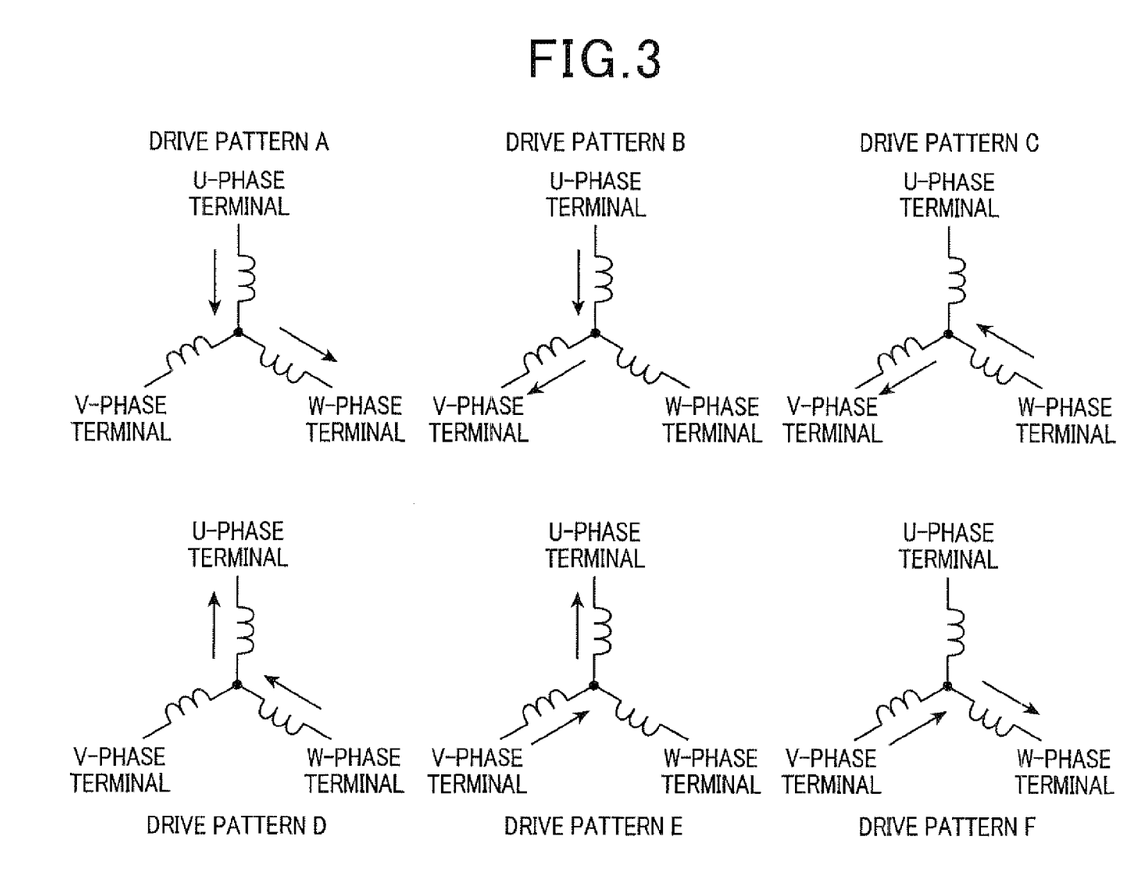
FIG. 3 is an explanatory view for explaining currents flowing through the respective phase coils of the motor for each of the driven states shown in FIG. 2.
Figure 4:
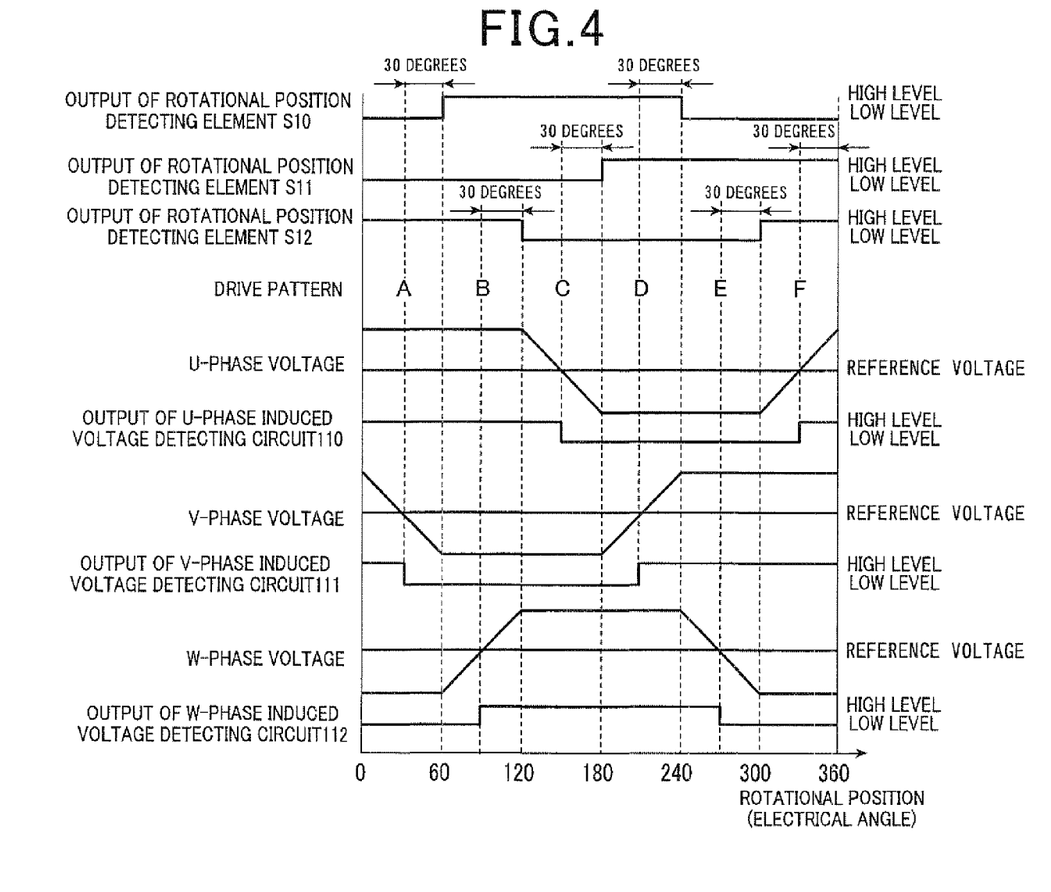
FIG. 4 is an explanatory view for explaining a relationship between an output signal of the rotational position detection device and an output signal of an induced voltage detection circuit included in the motor control apparatus.

Next, the operation of the motor control apparatus is explained with reference to FIGS. 1 to 4. FIG. 2 is an explanatory view for explaining various driven states of the power supply circuit 10 with respect to the output of the rotational position detection device S1. FIG. 3 is an explanatory view for explaining currents flowing through the respective phase coils of the motor M1 for each of the driven states shown in FIG. 2. FIG. 4 is an explanatory view for explaining a relationship in electrical angle between the output signal of the rotational position detection device S1 and the output signal of the induced voltage detection circuit 11.

As shown in FIG. 1, the rotational position detection device S1 detects the rotational position of the rotor of the motor M1, and outputs rectangular wave signals. In more detail, each of the rotational position detecting elements S1 to S3 detects the rotational position of the rotor for a corresponding one of the respective phases, and outputs a rectangular wave signal reflecting the detected rotational position. Each of the rectangular wave signals outputted from the rotational position detecting elements S1 to S3 has high level periods and low level periods each having a duration of 180 degrees in electrical angle. These rectangular wave signals are shifted in phase by 120 degrees one another. Accordingly, there occurs a level change from high to low or from low to high at every 60 degrees in these rectangular wave signals.

As shown in FIG. 1, the microcomputer 12 turns on and off the MOSFETs 100 to 105 in accordance with the output of the rotational position detection device S1. In more detail, the microcomputer 12 turns on and off the MOSFETs 100 to 105 in accordance with the levels of the rectangular wave signals outputted from the rotational position detecting elements S10 to S12. For example, during a period between 0 to 60 degrees, since the motor M1 is driven in accordance with a drive pattern A shown in FIG. 3 in which a current is passed in the direction from the U-phase terminal to the W-phase terminal of the motor M1, only the MOSFETs 100 and 105 are turned on. During a period between 60 to 120 degrees, since the motor M1 is driven in accordance with a drive pattern B in which a current is passed in the direction from the U-phase terminal to the V-phase terminal of the motor M1, only the MOSFETs 100 and 104 are turned on. During a period between 120 to 180 degrees, since the motor M1 is driven in accordance with a drive pattern C in which a current is passed in the direction from the W-phase terminal to the V-phase terminal of the motor M1, only the MOSFETs 102 and 104 are turned on. During a period between 180 to 240 degrees, since the motor M1 is driven in accordance with a drive pattern D in which a current is passed in the direction from the W-phase terminal to the U-phase terminal of the motor M1, only the MOSFETs 102 and 103 are turned on. During a period between 240 to 300 degrees, since the motor M1 is driven in accordance with a drive pattern E in which a current is passed in the direction from the V-phase terminal to the U-phase terminal of the motor M1, only the MOSFETs 101 and 103 are turned on. During a period between 300 to 360 degrees, since the motor M1 is driven in accordance with a drive pattern F in which a current is passed in the direction from the V-phase terminal to the W-phase terminal of the motor M1, only the MOSFETs 101 and 105 are turned on. By supplying power to the motor M1 through the power conversion circuit 10 in accordance with the above sequence, the motor M1 generates torque and starts to rotate.

On the other hand, as shown in FIG. 1, the induced voltage detection circuit 11 detects the induced voltages of the respective phases of the motor M1, and outputs a rectangular wave signal showing timings at which the polarity of the induced voltage changes for each of the respective phases. In more detail, as shown in FIG. 4, the induced voltage detection circuit 11 detects the induced voltage of one of the respective phases which is not supplied with a current, and outputs a rectangular wave signal showing timings at which the polarity of the induced voltage changes. For example, during a period between 120 to 180 degrees and a period between 300 to 360 degrees in which the motor M1 is driven in accordance with the drive pattern C and drive pattern F, respectively, and in which the U-phase is not supplied with a current, the U-phase induced voltage detection circuit 110 compares the U-phase induced voltage with the reference voltage, and outputs a rectangular wave signal showing timings at which the polarity of the U-phase induced voltage changes on the basis of the result of the comparison. The timings at which the rectangular wave signal changes from the high level to the low level, or from the low level to the high level are timings at which the polarity of the U-phase induced voltage changes. During a period between 0 to 60 degrees and a period between 180 to 240 degrees in which the motor M1 is driven in accordance with the drive pattern A and drive pattern D, respectively, and in which the V-phase is not supplied with a current, the V-phase induced voltage detection circuit 111 compares the V-phase induced voltage with the reference voltage, and outputs a rectangular wave signal showing timings at which the polarity of the V-phase induced voltage changes on the basis of the result of the comparison. During a period between 60 to 120 degrees and a period between 240 to 300 degrees in which the motor M1 is driven in accordance with the drive pattern B and drive pattern E, respectively, and in which the W-phase is not supplied with a current, the W-phase induced voltage detection circuit 112 compares the W-phase induced voltage with the reference voltage, and outputs a rectangular wave signal showing timings at which the polarity of the W-phase induced voltage changes on the basis of the result of the comparison.

The microcomputer 12 detects abnormality in the rotational position data which the rotational position data detection device S1 generates on the basis of the output of the induced voltage detection circuit 11. As shown in FIG. 4, the level change in the outputs of the U-phase, V-phase and W-phase induced voltage detection circuits 110, 111 and 112, and the level change in the outputs of the rotational position detecting elements S10 to S12 occur in an alternative manner. Accordingly, it can be determined that the rotational position data are abnormal if the level of the output signal of the induced voltage detection circuit 11 changes before the output signal of the rotational position detection device S1 changes after the output signal of the induced voltage detection circuit 11 has changed. Also, it can be determined that the rotational position data are abnormal if the level of the output signal of the rotational position detection device S1 changes after the level of the output signal of the induced voltage detection circuit 11 has changed, and thereafter, the level of the output signal of the rotational position detection device S1 changes again before the output signal of the induced voltage detection circuit 11 changes.

When at least one of the rotational position data is normal, even if the others are abnormal, the microcomputer 12 acquires rotational position data corresponding to abnormal one or more of the rotational position data, and controls the power supply circuit 10 in accordance with normal one or more of the rotational position data and the acquired rotational position data. On the other hand, when the rotational position data are all abnormal, the microcomputer 12 acquires correct rotational position data on the basis of the detection results by the induced voltage detection circuit 11, and turns on and off the MOSFETs 100 to 105 in accordance with the acquired rotational position data.

As shown in FIG. 4, the level change in the output signals of the U-phase, V-phase and W-phase induced voltage detection circuits 110, 111 and 112, and the level change in the output signals of the rotational position detecting elements S10 to S12 occur in an alternative manner. The timings at which the level change occur in the output signals of the rotational position detecting elements S10 to S12 are 30 degrees behind the timings at which the level change occur in the outputs of the U-phase, V-phase and W-phase induced voltage detection circuits 110, 111 and 112. For example, the timing at which the output signal of the rotational position detecting element S10 changes from the low level to the high level is 30 degrees after the timing at which the output signal of the U-phase induced voltage detection circuit 111 changes from the high level to the low level. The timing at which the output signal of the rotational position detecting element S10 changes from the high level to the low level is 30 degrees after the timing at which the output signal of the V-phase induced voltage detection circuit 111 changes from the low level to the high level. The output signal of the rotational position detecting element S11 and the output signal of the U-phase induced voltage detection circuit 110 are in the same timing relationship as above. Also, the output signal of the rotational position detecting element S12 and the output signal of the W-phase induced voltage detection circuit 112 are in the same timing relationship as above. Accordingly, by use of these timing relationships, it is possible to acquire the rotational position data from the detection results by the induced voltage detection circuit 11, and to control the power supply circuit 10 in accordance with the acquired rotational position data.

Next, the operation of the motor control apparatus 1 is explained in detail with reference to the flowchart shown in FIGS. 5 to 7.

Figure 5:
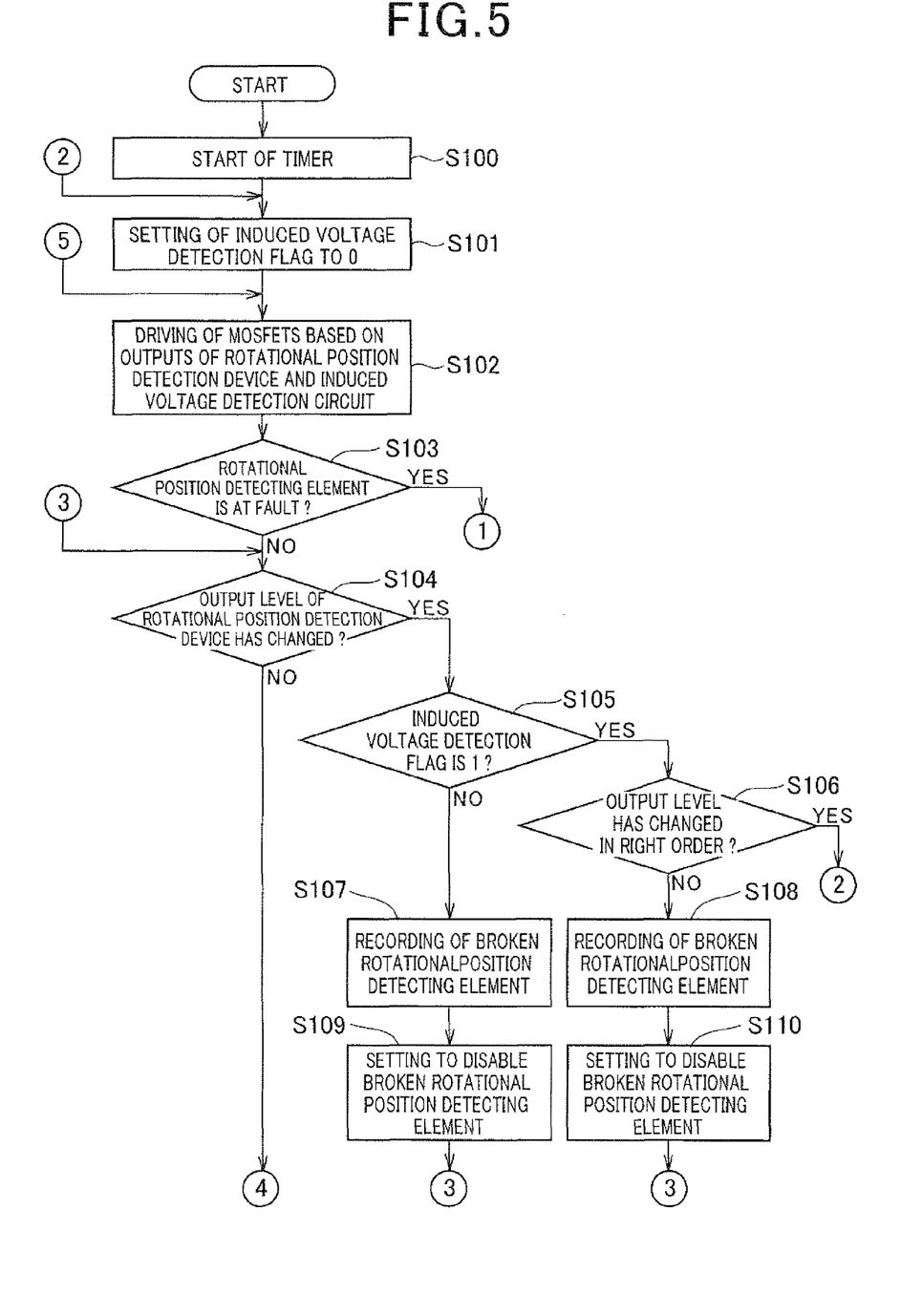
FIGS. 5 to 7 are diagrams of a flowchart showing an operation of the motor control apparatus.

As shown in FIG. 5, at the beginning of the operation, the microcomputer 12 causes an internal timer to start at step S100. Subsequently, the value of an induced voltage detection flag provided in the microcomputer 12 is set to 0 at step S101. Next, the drive pattern is determined on the basis of the output of the rotational position detection device S1 and the output of the induced voltage detection circuit 11 and drives the MOSFETs 100 to 105 in accordance with the determined drive pattern at step S102.

Thereafter, the microcomputer 12 determines whether the rotational position detecting element intended to be used for the next switching over of the driving pattern is at fault or not at step S103. In more detail, the microcomputer 12 checks whether a fault record for the rotational position detecting element intended to be used for the next switching over of the driving pattern is present or not.

Figure 7:
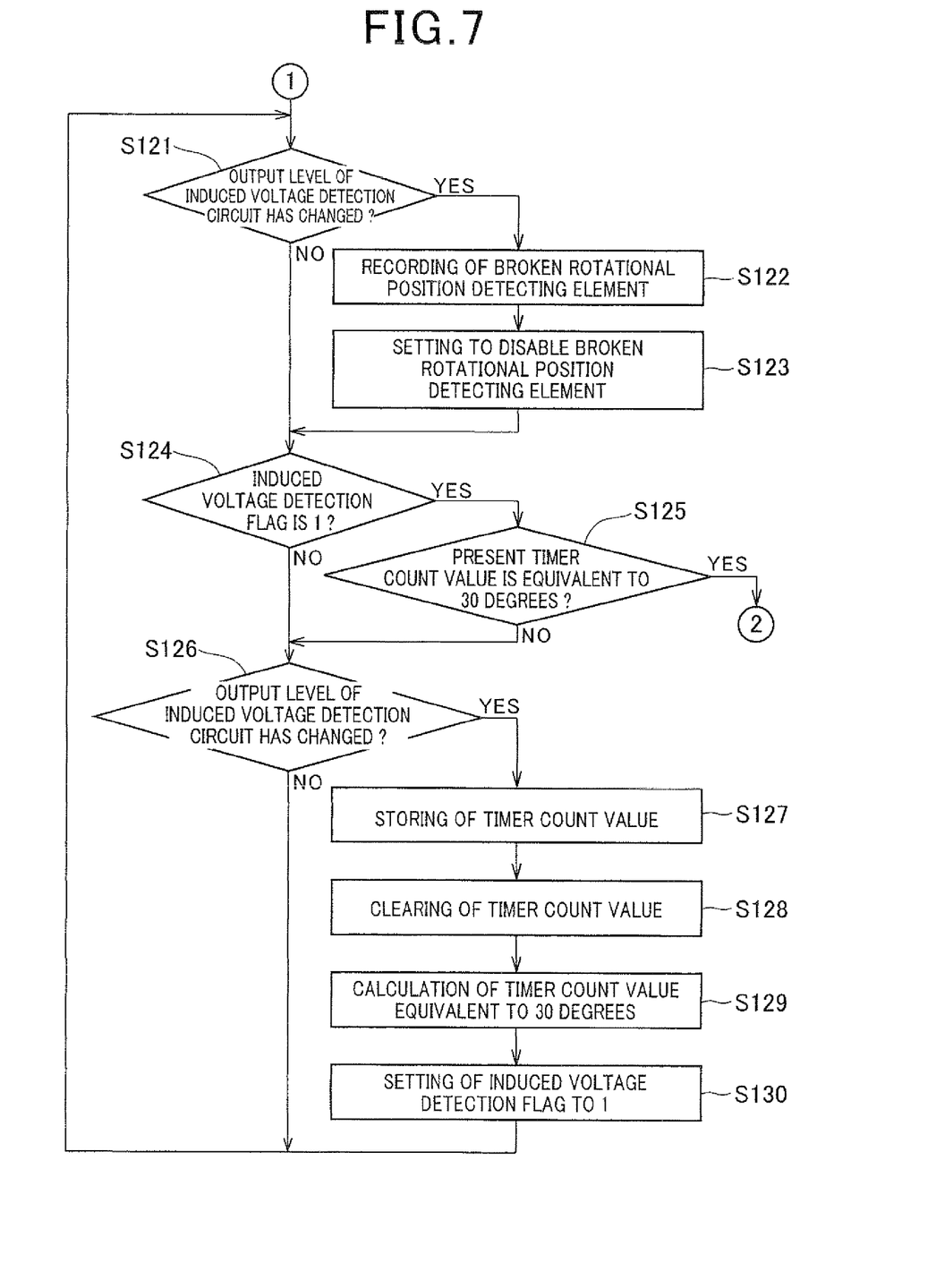

If the determination result at step S103 is affirmative, the operation proceeds to step S121 shown in FIG. 7.

On the other hand, if the determination result at step S103 is negative, the operation proceeds to step S104 where the microcomputer 12 determines whether or not the level of the output of the rotational position detection device S1 has changed. In more detail, the microcomputer 12 determines whether or not the output of the rotational position detection device S1 has changed from the high level to the low level, or from the low level to the high level.

If the determination result at step S104 is affirmative, operation proceeds to step S105 where the microcomputer 12 determines whether the value of the induced voltage detection flag is 1 or not.

If the determination result at step S105 is affirmative, the operation proceeds to step S106 to determine whether the output of the rotational position detection device S1 has changed in a right order.

If the determination result at step S106 is affirmative, the process returns to step S101.

On the other hand, if the determination result at step S105 is negative, or if the determination result at step S106 is negative, that is, if the rotational position detection device S1 is in a fault state, the malfunctioning rotational position detecting element is recorded at step S107 or step S108. Subsequently, setting is made so that the output of the broken position detecting element is not used hereinafter at step S109 or S110.

Figure 6:
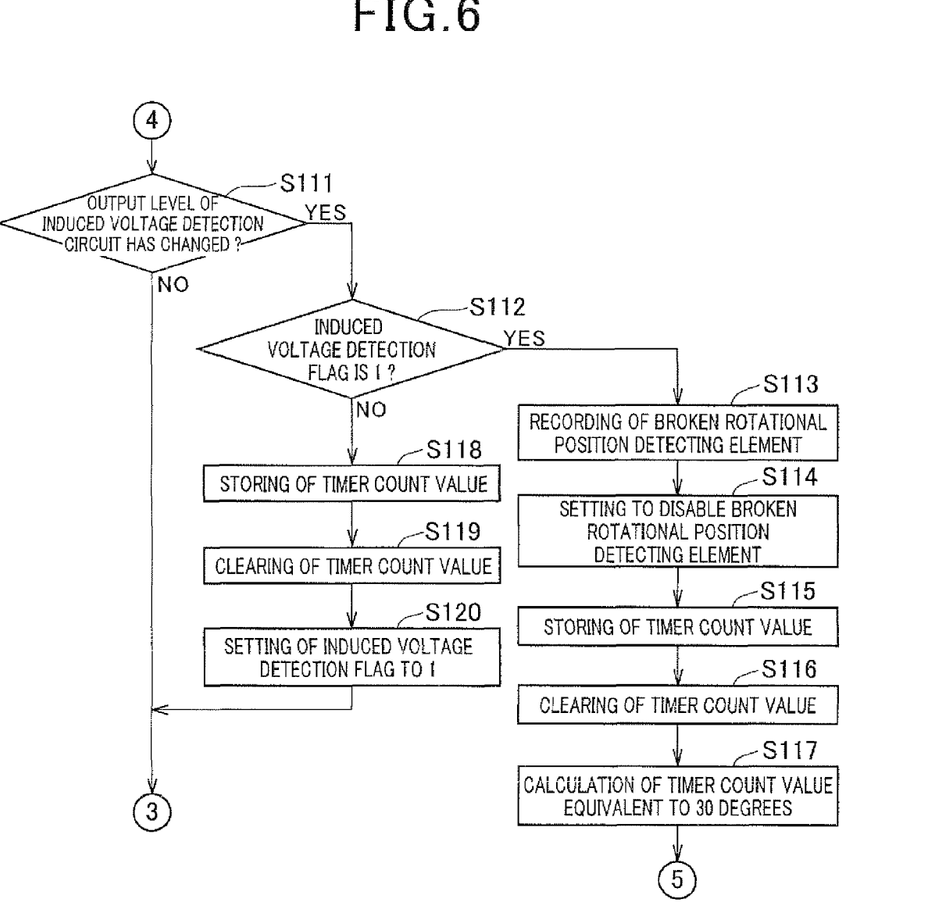

On the other hand, if the determination result at step S104 is negative, the operation proceeds to step S111 shown in FIG. 6 where the microcomputer 12 determines whether or not the output level of the induced voltage detection circuit 11 has changed.

If the determination result at step S111 is affirmative, the operation proceeds to step S112 where the microcomputer 12 determines whether the value of the induced voltage detection flag is 1 or not.

If the determination result at step S112 is affirmative, that is, if the rotational position data is abnormal, a broken one of the rotational position detecting elements is recorded at step S113. Subsequently, setting is made so that the output of the broken position detecting element is not used hereinafter at step S114. Also, the count value of the timer at the time is stored at step S115. That is, the count value equivalent to 60 degrees is stored. Subsequently, the count value of the timer is cleared at step S116. Thereafter, the operation proceeds to step S117 to calculate the count value equivalent to 30 degrees on the basis of the stored count value of the timer, and then returns to step S102.

On the other hand, if the determination result at step S112 is negative, the operation proceeds to step S118 to store the count value of the timer at the time. Subsequently, the count value of the timer is cleared at step S119. Thereafter, the operation proceeds to step S120 to set the induced voltage detection flag to 1, and then returns to step S104 shown in FIG. 5.

Also, if the determination result at step S111 is negative, the operation returns to step S104.

If the determination result at step S103 is affirmative, the operation proceeds to step S121 shown in FIG. 7 to determine whether or not the output level of the rotational position detection device S1 has changed.

If the determination result at step S121 is affirmative, a broken one of the rotational position detecting elements is recorded at step S122. Subsequently, setting is made so that the output of the broken position detecting element is not used hereinafter at step S123.

On the other hand, if the determination result at step S121 is negative, or when step S123 is completed, the operation proceeds to step S124 to determine whether the value of the induced voltage detection flag is 1 or not.

If the determination result at step S124 is affirmative, the operation proceeds to step S125 to determine whether the count value of the timer is equivalent to 30 degrees or not.

If the determination result at step S1125 is affirmative, the operation returns to step S101 shown in FIG. 5.

On the other hand, if determination result at step S124 is negative, or if the determination result at step S125 is negative, the operation proceeds to step S126 to determine whether or not the output level of the induced voltage detection circuit 11 has changed.

If the determination result at step S126 is affirmative, the operation proceeds to step S127 to store the count value of the timer at the time. That is, the count value equivalent to 60 degrees is stored. Subsequently, the count value of the timer is cleared at step S128. Thereafter, the operation proceeds to step S129 to calculate the count value equivalent to 30 degrees on the basis of the stored count value of the timer. Thereafter, the operation proceeds to step S130 to set the induced voltage detection flag to 1, and then returns to step S130.

Also, if the determination result at step S126 is negative, the operation returns to step S121.

The above embodiment of the present invention provides the following advantages. In this embodiment, the power supply circuit 10 is controlled in accordance with the rotational position data outputted from the rotational position detection device S1 when it is normal. On the other hand, when the rotational position data outputted from the rotational position detection device S1 is abnormal, the power supply circuit 10 is controlled in accordance with the detection results by the induced voltage detection circuit 11. The induced voltage of the motor M1 occurs and varies with the rotation of the rotor of the motor M1. Accordingly, it is possible to acquire the rotational position data of the rotor from the induced voltage of the motor M1. Hence, by continuing to control the power supply circuit 10 in accordance with the detection results by the induced voltage detection circuit 11 even after the rotational position data outputted from the rotational position detection device S1 becomes abnormal, the motor M1 can be controlled correctly.

In this embodiment, when at least one of the rotational position data is normal, the rotational position data corresponding to an abnormal one of the rotational position data is acquired on the basis of the detection results by the induced voltage detection circuit 11, so that the power supply circuit 10 is controlled in accordance with the normal one or ones of the rotational position data and the acquired rotational position data. This makes it possible to continue to control the motor M1 even when there is an abnormality in the rotational position data outputted from the rotational position detection device S1. Also, this embodiment enables starting a motor from the stopped state rapidly compared to conventional motor control apparatuses configured to drive a motor in accordance with predetermined drive patterns irrespective of the state of the motor.

According to this embodiment, the induced voltages of the respective phases of the motor M1 and the rotational position data for the respective phases are in a predetermined relationship in electrical angle. For example, as shown in FIG. 4, for each of the respective phases, the timings at which the level of the output signal of the induced voltage detection circuit 11 changes (or the timings at which the polarity of the induced voltage changes) are 30 degrees behind the timings at which the level of the rotational position data changes. Accordingly, it is possible to acquire the rotational position data on the basis of the timings of at which the polarity of the induced voltage changes.

Further, as shown in FIG. 4, the level change in the outputs of the U-phase, V-phase and W-phase induced voltage detection circuits 110, 111 and 112, and the level change in the outputs of the rotational position detecting elements S10 to S12 occur in an alternative manner. Accordingly, if the output signal of the induced voltage detection circuit 11 and the output signal of the rotational position detection device S1 are not in such a correct relationship, it can be determined that the rotational position data are abnormal.

Although the above embodiment is configured such that if at least one of the rotational position data is normal, this normal rotational position data is used to control the power supply circuit 10, the above embodiment may be modified such that even if at least one of the rotational position data is normal, all the rotational position data are acquired from the detection results by the induced voltage detection results, and the power supply circuit 10 is controlled in accordance with only the acquired rotational position data.

The above explained preferred embodiments are exemplary of the invention of the present application which is described solely by the claims appended below. It should be understood that modifications of the preferred embodiments may be made as would occur to one of skill in the art.

What is claimed is:

1. A motor control apparatus comprising:
a power supply function of supplying electric power from a power supply to a motor;
a rotational position detecting function of performing detection of a rotational position of a rotor of said motor for respective phases of said motor, and outputting first rotational position data indicative of result of said detection;
a control function of controlling a power supply operation of said power supply function in accordance with said first rotational position data; and
an induced voltage detecting function of performing detection of induced voltages of said respective phases of said motor;
wherein said control function controls said power supply operation of said power supply function in accordance with result of said detection performed by said induced voltage detecting function when said first rotational position data are abnormal,
wherein said control function acquires second rotational position data indicative of a rotational position of said rotor of said motor for said respective phases of said motor on the basis of result of said detection performed by said induced voltage detecting function when at least one of said first rotational position data is abnormal, and controls said power supply operation of said power supply function in accordance with said second rotational position data, and
wherein, when at least one of said first rotational position data is normal and at least one of said first rotational position data is abnormal, said control function acquires one of said second rotational position data corresponding to said abnormal one of said first rotational position data on the basis of result of said detection performed by said induced voltage detecting function, and controls said power supply operation of said power supply function in accordance with said first rotational position data excluding said abnormal one of said first rotational position data and one of said second rotational position data corresponding to said abnormal one of said first rotational position data.

2. A motor control apparatus comprising:
a power supply function of supplying electric power from a power supply to a motor;
a rotational position detecting function of performing detection of a rotational position of a rotor of said motor for respective phases of said motor, and outputting first rotational position data indicative of result of said detection;
a control function of controlling a power supply operation of said power supply function in accordance with said first rotational position data; and an induced voltage detecting function of performing detection of induced voltages of said respective phases of said motor;

wherein said control function controls said power supply operation of said power supply function in accordance with result of said detection performed by said induced voltage detecting function when said first rotational position data are abnormal, wherein said control function acquires second rotational position data indicative of a rotational position of said rotor of said motor for said respective phases of said motor on the basis of result of said detection performed by said induced voltage detecting function when at least one of said first rotational position data is abnormal, and controls said power supply operation of said power supply function in accordance with said second rotational position data, and wherein said control function acquires said second rotational position data on the basis of timings at which polarities of said induced voltages change.

3. The motor control apparatus according to claim 1, wherein said control function determines whether said first rotational position data are normal or not on the basis of result of said detection performed by said induced voltage detecting function.

4. The motor control apparatus according to claim 2, wherein said control function determines whether said first rotational position data are normal or not on the basis of result of said detection performed by said induced voltage detecting function.

* * * * *